United States Patent [19]

White

[11] 4,100,706
[45] Jul. 18, 1978

[54] ADVERSE CONDITIONING SYSTEM

[76] Inventor: John A. White, 123-10 Ocean Promenade, Belle Harbor, N.Y. 11713

[21] Appl. No.: 816,411

[22] Filed: Jul. 18, 1977

Related U.S. Application Data

[63] Continuation-in-part of Ser. No. 681,538, Apr. 29, 1976, abandoned.

[51] Int. Cl.² .............................................. E04B 1/72
[52] U.S. Cl. ......................................... 52/101; 47/26; 47/44
[58] Field of Search ................. 52/101; 47/26, 31, 45, 47/44, 47

[56] References Cited

U.S. PATENT DOCUMENTS

| 1,225,281 | 5/1917 | Sörensen | 47/46 |
|---|---|---|---|
| 2,830,404 | 4/1958 | Manning | 47/21 |
| 2,938,244 | 5/1960 | Christensen | 52/101 |
| 3,148,417 | 9/1964 | Bellas | 52/101 |
| 3,378,981 | 4/1968 | Horne | 52/677 |
| 3,416,266 | 12/1968 | Eron | 52/101 |
| 3,436,882 | 4/1969 | Keefe | 52/101 |
| 3,968,609 | 7/1976 | Deutsch | 52/677 |

FOREIGN PATENT DOCUMENTS

| 247,659 | 2/1964 | Austria | 47/45 |
|---|---|---|---|
| 443,304 | 8/1925 | Fed. Rep. of Germany | 47/31 |
| 698,146 | 8/1940 | Fed. Rep. of Germany | 47/31 |
| 1,955,217 | 5/1971 | Fed. Rep. of Germany | 52/101 |
| 2,055,376 | 5/1972 | Fed. Rep. of Germany | 52/101 |
| 677,916 | 12/1964 | Italy | 47/31 |

OTHER PUBLICATIONS

Mathematical Models by Candy & Rollett, ©1961, pp. 59–63.

Primary Examiner—Ernest R. Purser
Assistant Examiner—Henry Raduazo
Attorney, Agent, or Firm—C. Bruce Hamburg

[57] ABSTRACT

A system covering an area of ground for adverse conditioning web-footed aquatic birds against roosting in the area comprises an array of elongated members each sufficiently thin that a web-footed aquatic bird cannot roost upon an individual member and each sufficiently spaced in substantially horizontal planes from adjacent elongated members that a web-footed aquatic bird cannot roost simultaneously upon a plurality of the members, the array being sufficiently closely spaced to the ground at the aforementioned area to prevent the birds from alighting directly into the area.

4 Claims, 4 Drawing Figures

ADVERSE CONDITIONING SYSTEM

REFERENCE TO RELATED APPLICATION

This is a continuation-in-part of application Ser. No. 681,538, filed Apr. 29, 1976 and now abandoned.

BACKGROUND OF THE INVENTION

Web-footed aquatic birds, particularly gulls, have been found to be a severe safety hazard at airports adjacent to bodies of water. For example, at Kennedy Airport in 1975, a jet crashed to the ground immediately upon taking off when a large number of gulls was taken up into the jet engines. The gulls roost in areas adjacent the runways. The gulls may use the runways as areas upon which to drop clams in order to break open the clams and then, after feeding upon the clams, the gulls roost in the grassy areas adjacent the runways. As a jet races down the runway prior to take-off, the approaching loud noise startles the gulls and the gulls rise into the air together as the plane passes by, introducing the substantial risk of accidents of the type of which the aforementioned accident is an example.

Air cannons, shotguns and other devices for intermittently emitting loud sounds momentarily frighten the gulls but do not permanently change their roosting habits.

It is therefore, an object of the present invention to provide a system for adverse conditioning web-footed aquatic birds, particularly gulls, against roosting in an area.

Other objects and advantages of the invention will be apparent to one skilled in the art from the following description of the invention.

SUMMARY OF THE INVENTION

According to the invention, there is provided a system covering an area of ground for adverse conditioning web-footed aquatic birds against roosting in that area, the system comprising an array of elongated members each sufficiently thin that a web-footed aquatic bird cannot roost upon an individual member and each sufficiently spaced in substantial horizontal planes from adjacent elongated members that a wing-footed aquatic bird cannot roost simultaneously upon a plurality of the members, the array being sufficiently closely spaced to the ground at the area covered to prevent the birds from alighting directly into the area.

Preferably, the members are spaced from adjacent members in substantially horizontal planes a distance no greater than about two times the average wing span of the birds. It is particularly preferred that the array be a grid. It is also preferred that the array include members which are too low to permit the birds to walk thereunder. According to another aspect of the invention, the array is used in combination with intermittent loud sound emitting means, such as air cannons, installed for unimpaired audibility in the area covered by the array for the purpose of alarming birds which roost in the area despite the array. The systems of the invention are particularly intended for installation over areas adjacent to runways for aircraft. In principle, however, the systems of the invention are equally effective in adverse conditioning gulls from roosting on any other ground area upon which the systems are installed.

It is not necessary that the array make it physically impossible for the birds to roost in the area covered by the array. The invention is not based so much upon physically blocking the birds as it is upon psychologically conditioning the birds. The members of the array are sufficiently close to one another in substantially horizontal planes that there is a good probability that at least one of the wings of the bird will touch a member as the bird attempts to alight in or take off from the area covered by the array. The birds find this touching to be so disturbing that they become conditioned against even approaching the array. This type of conditioning is known as "adverse conditioning".

DESCRIPTION OF A PREFERRED EMBODIMENT

The invention will now be further described by reference to a specific embodiment, as illustrated in drawings, in which.

Figure 1:
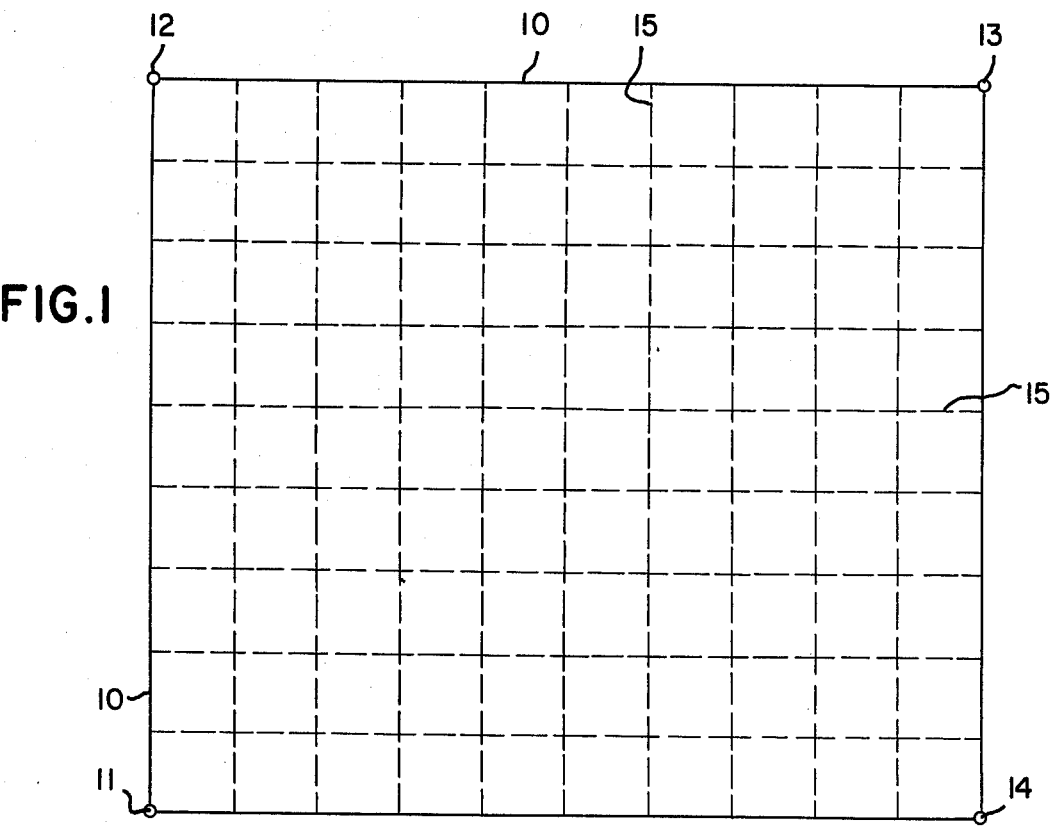
FIG. 1 is a plan view of a first system according to the invention.

With reference to FIG. 1, it is seen that a cable 10 is suspended between corner posts 11, 12, 13 and 14 to form a square. The ends of 18 nylon lines 15 are fastened to the cable 10, nine of the lines 15 running in one direction and the other nine running at right angles thereto. The lines 15 are equally spaced in both directions so that there is formed a grid. The grid is in the form of 5 foot squares located about 6 to 8 inches above ground level. At this height, it is inconvenient for a gull to walk under the grid. Moreover, because gulls have an average wing span on the order of 33 to 36 inches, a gull taking off or alighting into the grid system is likely to strike at least one of its wings against elongated members, that is the cable 10 or the lines 15, of the grid system. If it does not happen the first time, it is bound to happen within a few times. This contact is sufficiently traumatic to the gulls as to condition them against approaching the grid system. Naturally, the grid system can be made of sufficient size to cover a much larger area. Similarly, a plurality of the grid systems may be arranged on adjacent areas of the ground thereby to cover a much larger total area. A reason the contact of the members of the grid system with the wings of the gulls is so traumatic to the gulls is that it frequently interferes sufficiently with the flight of the gulls so as to physically upset the gulls. However, no actual physical harm is done to the gulls.

The following actual incident should serve to demonstrate that the ultimate impact of the system is psychological or behavioral. In one test, a grid system was installed where rising and falling tides eventually caused seaweed to completely cover the thin nylon line and stretch it to the point where it was essentially resting on the ground and could no longer function to interfere with the wings of a gull taking off or alighting. Nevertheless, the gulls had been sufficiently conditioned by their previous experience with the grid system that they refused to enter the area covered by the grid system. In this connection, it is significant to note that gulls are territorial. In other words, particular gulls will frequent a particular area. Hence, generally speaking, it is necessary to adversely condition only a limited gull population to keep an area covered by a grid system according to the invention largely free of gulls.

It is estimated that a grid system according to the invention is effective in reducing the gull population in an area covered by the system to about 10 to 20 percent of its former level. Moreover, when the system is used in conjunction with intermittent loud sound emitting means, such as an air cannon, installed for unimpaired audibility in the area covered by the grid system, the combined system is close to 100 percent effective. The reason is that the frequency of incidents in which the gulls are upset by the grid system is increased. In particular, when the loud blast of sound is emitted, gulls that happen to be located on the ground within the grid system are frightened into taking flight. Each time, however, that a gull alights into or takes off from the area covered by the grid system, there is a possibility that its wings will strike the members of the system. Hence, the gulls all the more quickly and all the more thoroughly become adversely conditioned to entering the area covered by the system.

Figure 2:
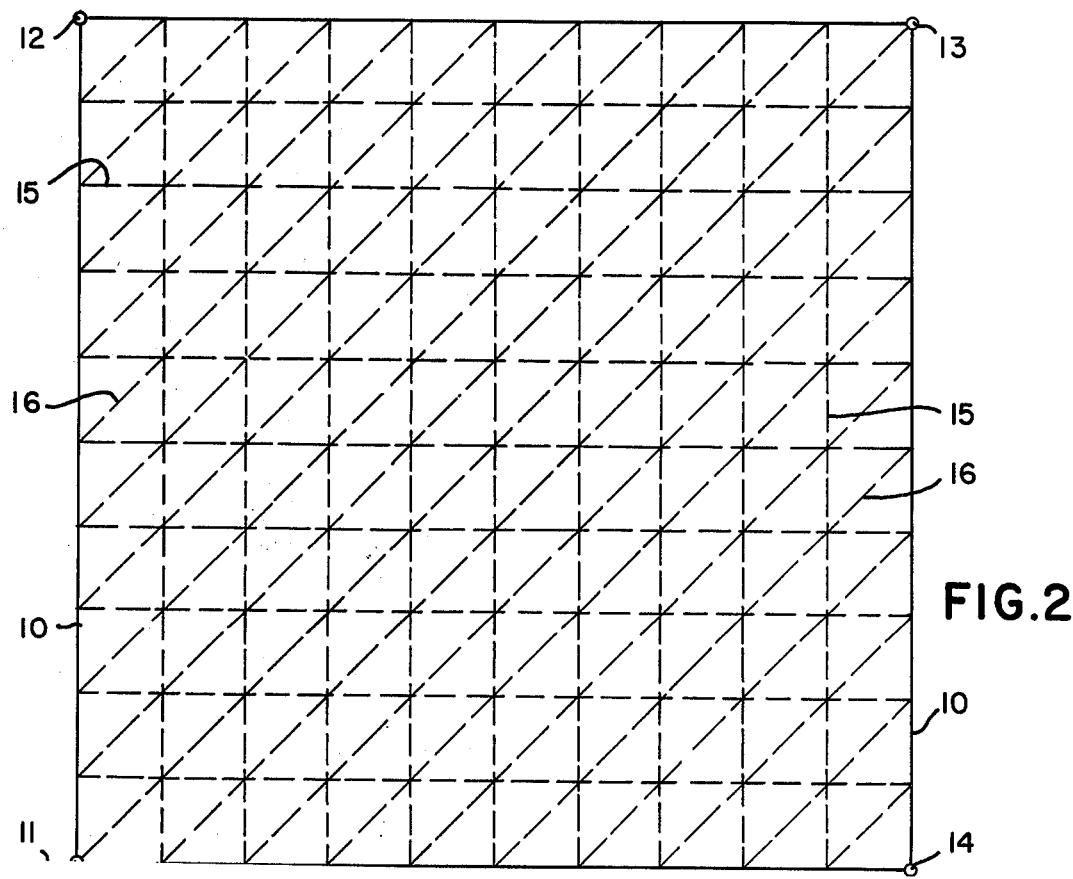
FIG. 2 is a plan view of a second system according to the invention.

With reference to FIG. 2, it is seen that a diagonal set of lines 16 has been superimposed on the grid system of FIG. 1 to make another grid system. This increases the frequency of incidents in which a gull's wings make contact with the members of the system.

Figure 3:
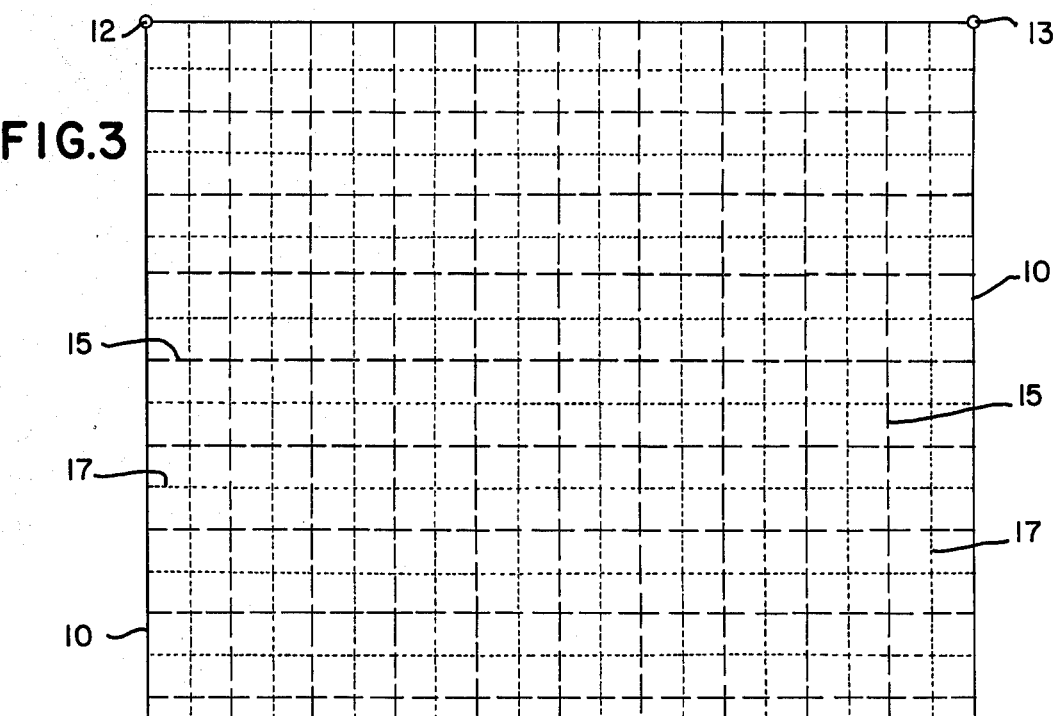
FIG. 3 is a plan view of a third system according to the invention.

The system of FIG. 3 is also, in principle, built upon the system of FIG. 1. The square grid of lines 15, 6 to 8 inches about the ground, is still there. However, now, in addition, there has been installed another square grid of lines 17, the grid of lines 17 bisecting the grid of lines 15 and being installed 12 to 20 inches above ground level. This gives the grid system three-dimensionality and, in effect, makes it into a baffle which indeed increases the possibility of the wings of a gull striking the members in the event a gull enters or leaves the area covered by the system.

Figure 4:
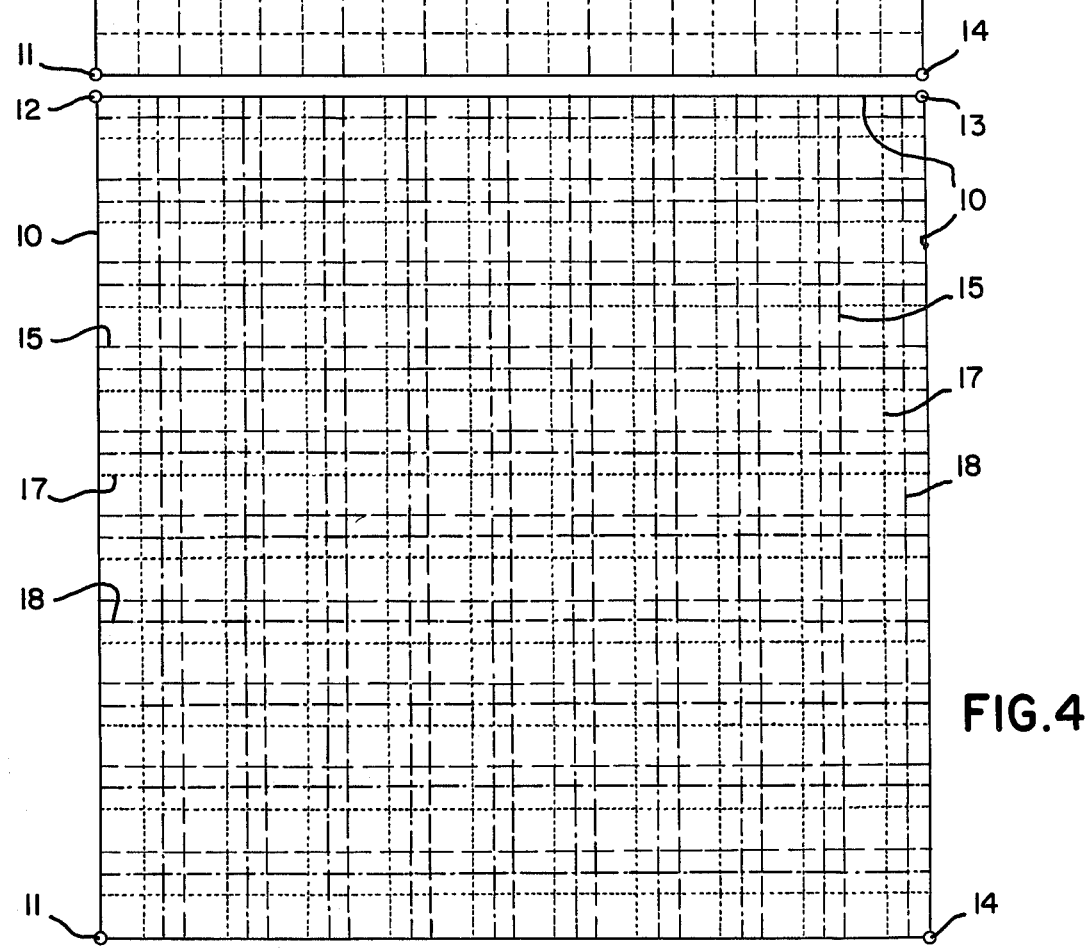
FIG. 4 is a plan view of a fourth system according to the invention.

The grid system of FIG. 4 is also built upon, in principle, the grid system of FIG. 1. In effect, three grid systems installed at the same level above the ground, namely 6 to 8 inches, successively bisect each other. Specifically, the grid system of lines 15 is bisected by the grid system of line 17 which in turn is bisected by the grid system of lines 18. The result is that the largest openings in the system are 2½ feet by 2½ feet and the other openings in the system are either 1¼ feet by 1¼ feet or 1¼ feet by 2½ feet. It is apparent that the probability of a gulls's wing striking a member of the system is increased.

It will be appreciated from the foregoing that projecting the grid onto a single plane, as it appears in FIGS. 1 to 4, the horizontal spacing between the members of the grid is from about 1 to about 6 feet. A simpler, practical way of expressing this is that lateral openings in the grid are from about 1 to about 6 feet. The maximum diameter of the lines making up the grid is one-sixteenth inch. This limitation satisfies the requirement that a web-footed aquatic bird not be able to roost upon an individual line. Of course, in the embodiments illustrated hereinabove and in other embodiments, the cable 10 forming the perimeter of the grid may be of greater thickness. This means that web-footed aquatic birds might roost on the perimeter cable 10. Consequently, the term "grid" as employed in the hereto appended claims with reference to the maximum diameter of the lines being one-sixteenth of an inch excludes the perimeter cables.

While the invention has been particularly described with reference to certain specific embodiments thereof, it is to be understood that these embodiments are intended to illustrate rather than to limit the invention. For example, other arrays of superimposed grids may be employed in which the members of the lowest grid are about 6 to 8 inches above the ground and the members of the highest grid are no more than about 30 inches above the ground.

What is claimed is:

1. A system covering an area of ground for adverse conditioning web-footed aquatic birds against roosting in said area, the system comprising a grid of intersecting elongated members each not greater than one-sixteenth inch in diameter and thus sufficiently thin that a web-footed aquatic bird cannot roost upon an individual member and each laterally spaced from adjacent elongated members a distance of from about 1 to about 6 feet, members of the grid being spaced from the ground at said area a distance no greater than about 8 inches, whereby a web-footed aquatic bird will be adversely conditioned against roosting in said area by the trauma caused it by its contacting said elongated members during some of its descents into and ascents from said area which will occur before it has become so adversely conditioned as to avoid alighting and roosting in said area.

2. A system according to claim 1, in combination with intermittent loud sound emitting means installed for unimpaired audibility in said area for alarming birds which roost in the area despite the array.

3. A system according to claim 1, in which the array is installed over an area adjacent a runway for aircraft.

4. A system according to claim 2, in which the array is installed over an area adjacent a runway for aircraft.

* * * * *